(12) United States Patent
Divakaran et al.

(10) Patent No.: US 9,734,730 B2
(45) Date of Patent: Aug. 15, 2017

(54) MULTI-MODAL MODELING OF TEMPORAL INTERACTION SEQUENCES

(71) Applicant: SRI International, Menlo Park, CA (US)

(72) Inventors: Ajay Divakaran, Monmouth Junction, NJ (US); Behjat Siddiquie, Plainsboro, NJ (US); Saad Khan, Hamilton, NJ (US); Jeffrey Lubin, Princeton, NJ (US); Harpreet S. Sawhney, Princeton Junction, NJ (US)

(73) Assignee: SRI International, Menlo Park, CA (US)

( * ) Notice: Subject to any disclaimer, the term of this patent is extended or adjusted under 35 U.S.C. 154(b) by 446 days.

(21) Appl. No.: 13/755,775

(22) Filed: Jan. 31, 2013

(65) Prior Publication Data

US 2014/0212853 A1   Jul. 31, 2014

(51) Int. Cl.
   *G09B 19/00* (2006.01)

(52) U.S. Cl.
   CPC .................................... *G09B 19/00* (2013.01)

(58) Field of Classification Search
   CPC .............................................. G09B 19/00
   USPC ....................................................... 434/236
   See application file for complete search history.

(56) References Cited

U.S. PATENT DOCUMENTS

| 8,243,116 B2 | 8/2012 | Qvarfordt et al. |
| 2003/0059750 A1* | 3/2003 | Bindler .................. G06Q 10/10 434/236 |
| 2004/0002838 A1 | 1/2004 | Oliver et al. |
| 2004/0106090 A1* | 6/2004 | Higgins et al. ............... 434/118 |
| 2005/0246165 A1* | 11/2005 | Pettinelli et al. ............. 704/207 |
| 2007/0156677 A1* | 7/2007 | Szabo ............................... 707/5 |
| 2008/0222671 A1* | 9/2008 | Lee ......................... H04H 60/31 725/10 |
| 2011/0185020 A1* | 7/2011 | Ramamurthy et al. ........ 709/204 |
| 2013/0101970 A1* | 4/2013 | Mascarenhas ................ 434/236 |
| 2013/0288212 A1* | 10/2013 | Bist ................................ 434/236 |

FOREIGN PATENT DOCUMENTS

WO    WO2011028844 A2    3/2011

OTHER PUBLICATIONS

Van Der Maaten, Laurens, et al., "Hidden-Unit Conditional Random Fields," printed Nov. 20, 2012, 10 pages.
"Hidden-Unit Conditional Random Fields," printed Apr. 30, 2013, 2 pages.
"Dynamic time warping," available at http://en.wikipedia.org/w/index.php?title=Dynamic_time_warping&oldid=520431095, printed Apr. 29, 2013, 3 pages.

(Continued)

*Primary Examiner* — Andrew Iwamaye
*Assistant Examiner* — Jerrydaryl Fletcher
(74) *Attorney, Agent, or Firm* — Moser Taboada

(57) ABSTRACT

A multi-modal interaction modeling system can model a number of different aspects of a human interaction across one or more temporal interaction sequences. Some versions of the system can generate assessments of the nature or quality of the interaction or portions thereof, which can be used to, among other things, provide assistance to one or more of the participants in the interaction.

24 Claims, 8 Drawing Sheets

(56) References Cited

OTHER PUBLICATIONS

Dong, Wen, et al., "Automatic Prediction of Small Group Performance in Information sharing Tasks," MIT Media Lab, Cambridge, MA, printed Dec. 12, 2012, 8 pages.
Van Kasteren, T.L.M., et al., "Conditional Random Fields versus Hidden Markov Models for activity recognition in temporal sensor data," University of Amsterdam, The Netherlands, printed Jan. 7, 2013, 7 pages.
McCown, Iain, et al., "Automatic Analysis of Multimodal Group Actions in Meetings," printed Jan. 7, 2013, 14 pages.
U.S. Appl. No. 13/737,607 to Cheng et al., filed Jan. 9, 2013, 55 pages.
U.S. Appl. No. 13/158,109 to Senanayake et al., filed Jun. 6, 2011, 53 pages.
U.S. Appl. No. 13/399,210 to Senanayake et al., filed Feb. 17, 2012, 40 pages.
U.S. Appl. No. 13/631,292 to Denker et al., filed Sep. 28, 2012, 64 pages.
U.S. Appl. No. 13/755,783 to Divakaran et al., filed Jan. 31, 2013, 51 pages.

\* cited by examiner

MULTI-MODAL MODELING OF TEMPORAL INTERACTION SEQUENCES

GOVERNMENT RIGHTS

This invention was made in part with government support under contract number W911NF-12-C-0001 awarded by the Defense Advanced Research Projects Agency (DARPA). The Government has certain rights in this invention.

BACKGROUND

Human interactions are observed for many different purposes, including counseling, training, performance analysis, and education. Human interactions typically involve a combination of verbal and non-verbal communications. Different people can express the same verbal and non-verbal communications differently. In addition, differences in body size and anthropometry can cause the same non-verbal communication to appear differently when expressed by different people. Further, some verbal and non-verbal expressions exhibited during an interaction may be posed or "acted," while others are natural and spontaneous. For these and other reasons, it has been very difficult for automated systems to accurately analyze and interpret human interactions.

SUMMARY

According to at least one aspect of this disclosure, a method for assessing an interaction involving at least two participants, at least one of the participants being a person, includes, with a computing system: detecting, from multimodal data captured by at least one sensing device during the interaction, a plurality of different behavioral cues expressed by the participants; analyzing the detected behavioral cues with respect to a plurality of different time scales, each of the time scales being defined by a time interval whose size can be compared to the size of other time intervals of the interaction; recognizing, based on the analysis of the detected behavioral cues, a temporal interaction sequence comprising a pattern of the behavioral cues corresponding to one or more of the time scales; and deriving, from the temporal interaction sequence, an assessment of the efficacy of the interaction.

The different behavioral cues of the temporal interaction sequence may involve at least one non-verbal cues. The method may include recognizing a plurality of temporal interaction sequences occurring over different time intervals, where at least one of the temporal interaction sequences involves behavioral cues expressed by the person and behavioral cues expressed by another participant, and deriving the assessment from the plurality of temporal interaction sequences. The different behavioral cues may include a cue relating to one or more of: a gesture, a body pose, a head pose, an eye gaze, a facial expression, a voice tone, a voice loudness, another non-verbal vocal feature, and verbal content. The method may include semantically analyzing verbal content of at least one of the behavioral cues and recognizing the temporal interaction sequence based on the semantic analysis of the verbal content. The method may include semantically analyzing the verbal content of at least one of the behavioral cues and deriving the assessment based on the semantic analysis of the verbal content. The method may include analyzing the relative significance of each behavioral cue in relation to the temporal interaction sequence as a whole, and deriving the assessment based on the relative significance of each behavioral cue to the temporal interaction sequence as a whole. The method may include analyzing the relative significance of each behavioral cue in relation to the other behavioral cues of the temporal interaction sequence, and deriving the assessment based on the relative significance of each of the behavioral cues of the temporal interaction sequence. The method may include recognizing a plurality of temporal interaction sequences, deriving an assessment of the nature of each temporal interaction sequence, and determining changes in the efficacy of the interaction over time based on the assessments of each of the temporal interaction sequences. The method may include recognizing a plurality of temporal interaction sequences, deriving an assessment of the nature of each temporal interaction sequence, and evaluating the overall efficacy of the interaction based on the assessments of the temporal interaction sequences. The method may include recognizing a plurality of temporal interaction sequences having overlapping time intervals and deriving the assessment based on the plurality of temporal interaction sequences having overlapping time intervals. The behavioral cues of the temporal interaction sequence may include at least one behavioral cue that indicates a positive interaction and at least one behavioral cue that indicates a negative interaction. The method may include presenting a suggestion to one or more of the participants based on the assessment. The method may include generating a description of the interaction based on the assessment. The description may include a recounting of the interaction, and the recounting may include one or more behavioral cues having evidentiary value to the assessment. The method may include determining a semantic meaning of the pattern of related behavioral cues and using the semantic meaning to derive the assessment. The method may include determining the pattern of related behavioral cues using a graphical model. The graphical model may include a discriminative probabilistic model. The discriminative probabilistic model may include conditional random fields. The method may include developing the assessment of the interaction based on changes in the behavioral cues of at least one of the participants over time during the interaction. The method may include inferring one or more events from the temporal interaction sequence, the one or more events each comprising a semantic characterization of at least a portion of the temporal interaction sequence, deriving an assessment of the one or more events based on the behavioral cues, and deriving the assessment of the efficacy of the interaction based on the assessment of the one or more events. The method may include determining relationships between or among the behavioral cues of the temporal interaction sequence. The duration of each of the plurality of different time scales may be defined by the detection of at least two of the behavioral cues.

According to at least one aspect of this disclosure, a method for assessing an interaction involving at least two participants, at least one of the participants being a person, includes, with a computing system: detecting, from multimodal data captured by at least one sensing device, a plurality of different behavioral cues expressed by the participants during the interaction, the behavioral cues comprising one or more non-verbal cues and verbal content; recognizing a temporal interaction sequence comprising a pattern of the behavioral cues occurring over a time interval during the interaction; and deriving, from the temporal interaction sequence, an assessment of the efficacy of the interaction.

According to at least one aspect of this disclosure, a method for assessing a person's emotional state during an interaction involving the person and at least one other participant includes, with a computing system: detecting, from multi-modal data captured by one or more sensing devices, a plurality of different behavioral cues expressed by the participants during the interaction; recognizing a plurality of temporal interaction sequences, each temporal interaction sequence comprising a pattern of the behavioral cues occurring over a time interval during the interaction, and at least one of the temporal interaction sequences involving behavioral cues of the person and behavioral cues of at least one other participant; assessing the person's emotional state during each of the temporal interaction sequences based on the behavioral cues involved in the temporal interaction sequence; determining a relative significance of each of the temporal interaction sequences to the interaction; and assessing the person's emotional state during the interaction as a whole based on the person's assessed emotional state during each of the temporal interaction sequences and the determined relative significance of each of the temporal interaction sequences to the interaction as a whole.

The method may include assessing at least one other participant's emotional state during the temporal interaction sequences based on the behavioral cues involved in the temporal interaction sequences, and using the assessment of the other participant's emotional state to evaluate the emotional state of the person. The method may include determining an aspect of the person's behavior based on the person's assessed emotional state during one or more of the temporal interaction sequences and the time interval in which it occurred relative to the total duration of the interaction. The method may include determining a degree of intensity of a behavioral cue of the person and using the degree of intensity to recognize one or more of the temporal interaction sequences. The method may include determining the relative significance of each of the temporal interaction sequences by comparing the behavioral cues involved in the temporal interaction sequence to the behavioral cues involved in the other temporal interaction sequences. The behavioral cues involved in the temporal interaction sequences may include verbal content and non-verbal cues. The behavioral cues involved in the temporal interaction sequences may include cues relating to one or more of: a gesture, a body pose, a head pose, an eye gaze, a facial expression, a voice tone, a voice loudness, another non-verbal vocal feature, and verbal content. The method may include assessing the person's emotional state by analyzing changes in the person's behavior over time during one or more of the temporal interaction sequences. The method may include assessing the person's emotional state by analyzing changes in the person's behavior in response to the behavior of other participants during one or more of the temporal interaction sequences. Two or more of the temporal interaction sequences may occur over different time intervals, and the method may include assessing the person's emotional state by analyzing the person's behavior over the different time intervals during the interaction. The method may include assessing the person's emotional state by analyzing the relative degree of emotion expressed by the person during one or more of the temporal interaction sequences. The method may include assessing the person's emotional state by analyzing the semantic meaning of verbal content of the behavioral cues. The method may include assessing the person's emotional state using conditional random fields and by analyzing one or more hidden states of the conditional random fields.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
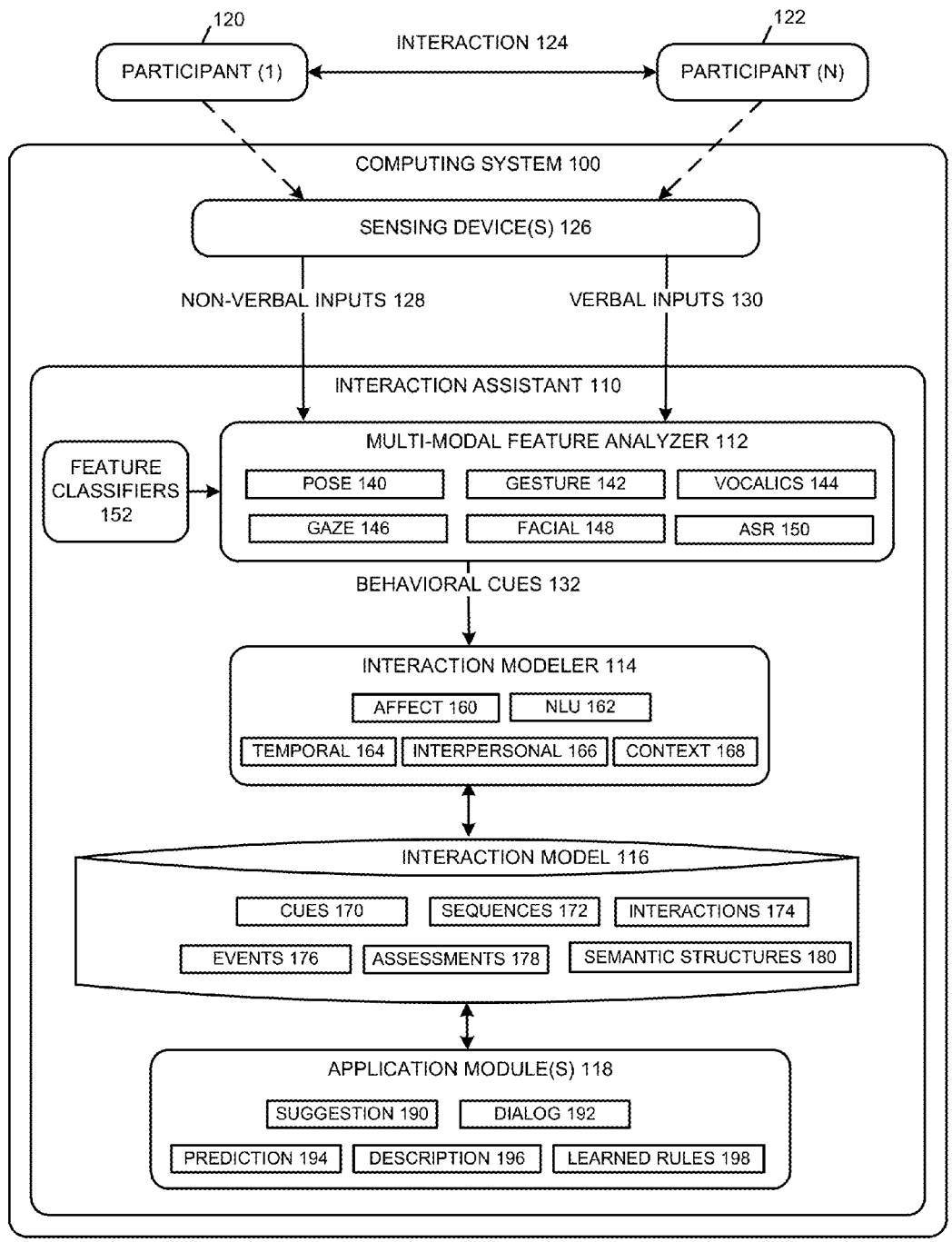
FIG. 1 is a simplified module diagram of at least one embodiment of a computing system including an interaction assistant to analyze human interactions.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Many human interactions are dynamic in the sense that the behavioral state of one or more of the participants may change or fluctuate over the course of the interaction. For example, in a customer service-type setting, a customer may be anxious or upset at the beginning of an interaction with a service provider, but over time (and in response to the service provider's demeanor, perhaps), the customer may calm down and even end the interaction on a positive note. On the other hand, the service provider's verbal and/or non-verbal communication may inadvertently contribute to the escalation of tension during the interaction. Subsequently, however, another participant may join the interaction and defuse the situation. Moreover, as may be apparent from the foregoing example, the reasons for the changes in the participants' behavioral state over time can be subtle and complex. In some cases, a person's reaction may be a response to another's behavioral cues, while in other cases the reaction may be simply the result of a recent change in the person's local environment (such as another person walking by or someone joining the meeting).

Human interactions involving non-human participants, such as virtual characters or avatars (e.g., electronic images that represent computer users, as in a computer game or simulation), or virtual personal assistants (VPAs), are often similarly non-stationary. For instance, a person using an interactive software application, such as a VPA or an e-commerce web site, may be initially very enthusiastic and even entertained by the nature of the interaction. However, over time, the person may become distracted, impatient, or frustrated if his or her desired objective is not achieved. The non-stationarity of human interactions is a challenge for automated systems.

A multi-modal, multi-temporal approach to interaction modeling as described in this disclosure can account for the dynamic nature of human interactions, whether those interactions may be with other people, with electronic devices or systems, or with other living things. A dynamic model is developed, which recognizes temporal interaction sequences of behavioral cues or "markers" and considers the relative significance of verbal and non-verbal communication. The dynamic model can take into account a variety of different non-verbal inputs, such as eye gaze, gestures, rate of speech, speech tone and loudness, facial expressions, head pose, body pose, paralinguistics, and/or others, in addition to verbal inputs (e.g., speech), in detecting the nature and/or intensity of the behavioral cues. Additionally, the model can consider the behavioral cues over multiple time granularities. For example, the model can consider the verbal and/or non-verbal behavior of various individuals involved in the interaction over short-term (e.g., an individual action or event occurring within a matter of seconds), medium-term (e.g., a greeting ritual lasting several seconds or longer), and/or long-term (e.g., a longer segment of the interaction or the interaction as a whole, lasting several minutes or longer) time scales.

Referring now to FIG. 1, a number "N" (where N is a positive integer greater than one) of participants 120, 122 may engage in an interaction 124. A computing system 100 is equipped with one or more sensing devices 126, which "observe" the participants 120, 122 and capture multi-modal data including non-verbal inputs 128 and/or verbal inputs 130 relating to the participants' behavior over the course of the interaction 124. An interaction assistant 110 embodied in the computing system 100 analyzes and interprets the inputs 128, 130, and identifies therefrom the various types of verbal and/or non-verbal behavioral cues 132 expressed by one or more of the participants 120, 122 over time during the interaction 124. (Note that, in cases in which the interaction 124 involves a person and an electronic device, the computing system 100 or more particularly, the interaction assistant 110 itself, may be one of the participants).

By "cues" we mean, generally, human responses to internal and/or external stimuli, such as expressive or communicative indicators of the participants' behavioral, emotional, or cognitive state, and/or indicators of different phases, segments, or transitions that occur during the interaction 124. For example, an indication that two participants have made eye contact may indicate an amicable interaction, while an indication that one of the participants is looking away while another participant is talking may indicate boredom or distraction during part of the interaction. Similarly, a sequence of cues involving eye contact followed by a handshake may indicate that a greeting ritual has just occurred or that the interaction is about to conclude, depending upon the time interval in which the sequence occurred (e.g., within the first few seconds or after several minutes).

The illustrative interaction assistant 110 can assess the nature and/or efficacy of the interaction 124 in a number of different ways during, at and/or after the conclusion of the interaction 124, based on its analysis of the behavioral cues 132 over one or more different time scales. Alternatively or additionally, using the behavioral cues 132, the interaction assistant 110 can assess the cognitive and/or emotional state of each of the participants 120, 122 over the course of the interaction 124, as well as whether and how the participants' states change over time. Using multiple different time scales, the interaction assistant 110 can assess the relative significance of different behavioral cues 132 in the context of different segments of the interaction 124; that is, as compared to other behavioral cues (including those expressed by other participants), and/or in view of the time interval in which the cues occurred relative to the total duration of the interaction 124. These and other analyses and assessment(s) can be performed by the interaction assistant 110 "live" (e.g., while the interaction 124 is happening, or in "real time") and/or after the interaction 124 has concluded (e.g., based on the recorded and/or captured inputs 128, 130, which may be stored in storage media of the computing system 100, for example).

As indicated above, the participants 120, 122 in the interaction 124 include at least one human participant. Other participants may include other persons, electronic devices (e.g., smart phones, tablet computers, or other electronic devices), and/or other living things (e.g., a human interacting with an animal, such as a researcher or animal trainer). In general, the interaction 124 may take the form of an exchange of verbal and/or non-verbal communication between or among the participants 120, 122. The interaction 124 may occur whether or not all of the participants 120, 122 are at the same geographic location. For example, one or more of the participants 120, 122 may be involved in the interaction 124 via videoconferencing, a webcam, a software application (e.g., FACETIME), and/or other means.

The sensing device(s) 126 are positioned so that they can observe or monitor one or more of the participants 120, 122 during the interaction 124. The sensing device(s) 126 are configured to record, capture or collect multi-modal data during the interaction 124. For ease of discussion, the term "capture" may be used herein to refer to any suitable technique(s) for the collection, capture, recording, obtaining, or receiving of data from the sensing device(s) 126 and/or other electronic devices or systems. In some cases, one or more of the sensing devices 126 may be located remotely from the interaction assistant 110 and thus, the interaction assistant 110 may obtain or receive the multi-modal data by electronic communications over one or more telecommunications and/or computer networks (using, e.g., "push," "pull," and/or other data transfer methods).

By multi-modal, we mean, generally, that at least two different types of data are captured by at least one sensing device 126. For example, the multi-modal data may include audio, video, motion, temperature, proximity, gaze (e.g., eye focus or pupil dilation), and/or other types of data. As such, the sensing device(s) 126 may include, for instance, a microphone, a video camera, a still camera, an electro-optical camera, a thermal camera, a motion sensor or motion sensing system (e.g., the MICROSOFT KINECT system), an accelerometer, a proximity sensor, a temperature sensor, a physiological sensor (e.g., heart rate and/or respiration rate sensor) and/or any other type of sensor that may be useful to capture data that may be pertinent to the analysis of the interaction 124. In some cases, one or more of the sensing devices 126 may be positioned unobtrusively, e.g., so that the participants 120, 122 are not distracted by the fact that the interaction 124 is being observed. In some cases, one or more of the sensing devices 126 may be attached to or carried by one or more of the participants 120, 122. For instance, physiological sensors worn or carried by one or more of the participants 120, 122 may produce data signals that can be analyzed by the interaction assistant 110. Additionally, in some cases, one or more of the sensing devices 126 may be housed together, e.g., as part of a mobile electronic device, such as a smart phone or tablet computer that may be carried by a participant or positioned in an inconspicuous or conspicuous location as may be desired in particular embodiments of the system 100. In any event, the data signals produced by the sensing device(s) 126 provide the non-verbal inputs 128 and/or the verbal inputs 130 that are analyzed by the interaction assistant 110. For example, data signals produced by a video camera that is positioned to record the interaction 124 or one or more of the participants 120, 122 may indicate non-verbal features such facial expressions, non-speech vocal features, eye focus and/or level of dilation, body poses, gestures, and actions, such as sitting, standing, or shaking hands) and/or verbal features (e.g., speech).

The illustrative interaction assistant 110 is embodied as a number of computerized modules and data structures including a multi-modal feature analyzer 112, an interaction modeler 114, an interaction model 116, one or more application modules 118, and one or more feature classifiers 152. The multi-modal feature analyzer 112 applies the feature classifiers 152 to the non-verbal inputs 128 and the verbal inputs 130 to identify therefrom the behavioral cues 132 expressed by one or more of the participants 120, 122 during the interaction 124. In some embodiments, the feature classifiers 152 are embodied as statistical or probabilistic algorithms that, for example, take an input "x" and determine a mathematical likelihood that x is similar to a known feature, based on "training" performed on the classifier using a large number of known samples. If a match is found for the input x with a high enough degree of confidence, the data stream is annotated or labeled with the corresponding description, accordingly. In some embodiments, one or more of the classifiers 152 is configured to detect the behavioral cues 132 over multiple time scales, as described further below. Some examples of classifiers 152 that may be used to identify people, scenes, actions and/or events from low-level features in a video are described in Cheng et al., U.S. patent application Ser. No. 13/737,607, filed Jan. 9, 2013, which is incorporated herein by this reference. Similar types of classifiers, and/or others, may be used to recognize facial expressions and/or other behavioral cues 132.

The illustrative multi-modal feature analyzer 112 is embodied as a number of sub-modules or sub-systems, including a pose recognizer 140, a gesture recognizer 142, a vocal feature recognizer 144, a gaze analyzer 146, a facial feature recognizer 148, and an automated speech recognition (ASR) system 150. These sub-modules process the streams of different types of multi-modal data to recognize the low-level features depicted therein or represented thereby. Such processing may be done by the various sub-modules or sub-systems 140, 142, 144, 146, 148, 150 in parallel (e.g., simultaneously across multiple modalities) or sequentially, and independently of the others or in an integrated fashion. For instance, early and/or late fusion techniques may be used in the analysis of the multi-modal data. In general, early fusion techniques fuse the multi-modal streams of data together first and then apply annotations or labels to the fused stream, while late fusion techniques apply the annotations or labels to the separate streams of data (e.g., speech, body pose, etc.) first and then fuse the annotated streams together.

In embodiments in which one or more participant's body pose, head pose, and/or gestures are analyzed, the pose recognizer 140 and gesture recognizer 142 process depth, skeletal tracing, and/or other inputs (e.g., x-y-z coordinates of head, arms, shoulders, feet, etc.) generated by the sensing device(s) 126 (e.g., a KINECT system), extract the low-level features therefrom, and apply pose and gesture classifiers (e.g., Support Vector Machine or SVM classifiers) and matching algorithms (e.g., normalized correlations, dynamic time warping, etc.) thereto to determine the pose or gesture most likely represented by the inputs 128, 130. Some examples of such poses and gestures include head tilted forward, head tilted to side, folded arms, hand forward, standing, hand to face, hand waving, swinging arms, etc. In some embodiments, the pose analyzer 140 may use these and/or other techniques similarly to classify body postures in terms of whether they appear to be, for example, "positive," "negative," or "neutral."

In embodiments in which one or more participant's vocal features (e.g., non-speech features and/or paralinguistics such as voice pitch, speech tone, energy level, and OpenEars features) are analyzed, the vocal feature recognizer 144 extracts and classifies the sound, language, and/or acoustic features from the inputs 128 and associates them with the corresponding participants 120, 122. In some embodiments, voice recognition algorithms may use Mel-frequency cepstral coefficients to identify the speaker of particular vocal features. Language recognition algorithms may use shifted delta cepstrum cofficients and/or other types of transforms (e.g., cepstrum plus deltas, ProPol $5^{th}$ order polynomial transformations, dimensionality reduction, vector quantization, etc.) to analyze the vocal features. To classify the vocal features, SVMs and/or other modeling techniques (e.g., GMM-UBM Eigenchannel, Euclidean distance metrics, etc.) may be used. In some embodiments, a combination of multiple modeling approaches may be used, the results of which are combined and fused using, e.g., logistic regression calibration. In this way, the vocal feature recognizer 144 can recognize vocal cues including indications of, for example, excitement, confusion, frustration, happiness, calmness, agitation, and the like.

In embodiments in which one or more participant's gaze is analyzed, the gaze analyzer 146 considers non-verbal inputs 128 that pertain to eye focus, duration of gaze, location of the gaze, and/or pupil dilation, for example. Such inputs may be obtained or derived from, e.g., video clips of a participant 120, 122. In some embodiments, the semantic content of the subject of a participant's gaze may be analyzed. Some examples of gaze tracking systems and techniques for semantically understanding content at the location of a person's gaze are described in U.S. patent application Ser. No. 13/158,109 (Adaptable Input/Output Device), Ser. No. 13/399,210 (Adaptable Actuated Input Device with Integrated Proximity Detection), and Ser. No. 13/631,292 (Method and Apparatus for Modeling Passive and Active User Interactions with a Computer System). Alternatively or in addition, a commercially available eye-tracking system may be used (such as the 600 Series Eye Tracker available from LC Technologies, Inc. or the "Eye Tracking on a Chip" available from EyeTech Digital Systems). In general, eye tracking systems monitor and record the movement of a person's eyes and the focus of his or her gaze using, e.g., an infrared light that shines on the eye and reflects back the position of the pupil. The gaze analyzer 146 can, using these and other techniques, determine cues 128 that indicate, for example, boredom, confusion, engagement with a subject, distraction, comprehension (e.g., of another participant's cues 128, 130), and the like.

In embodiments in which one or more participant's facial expression, head or face pose, and/or facial features are analyzed, the facial feature recognizer 148 analyzes non-verbal inputs 128 obtained from, e.g., video clips, alone or in combination with motion and/or kinetic inputs such as may be obtained from a KINECT or similar system. In some embodiments, low and mid-level facial features are extracted from the inputs 128 and classified using facial feature classifiers 152 (many existing examples are publicly available). From this, the facial feature recognizer 148 can detect, e.g., smiles, raised eyebrows, frowns, and the like. As described further below, in some embodiments, the facial expression information can be integrated with face pose, body pose, speech tone, and/or other inputs to derive indications of the participants' emotional state, such as anger, confusion, disgust, fear, happiness, sadness, or surprise.

The ASR system 150 identifies spoken words and/or phrases in the verbal inputs 130 and, in some embodiments, translates them to text form. There are many ASR systems commercially available; one example is the DYNASPEAK system, available from SRI International. When used in connection with the interaction assistant 110, the ASR system 150 can provide verbal cues that can, after processing by the NLU system 162 described below, tend to indicate the nature or efficacy of the interaction 124. For example, words like "sorry" may indicate that the interaction 124 is going poorly or that a participant 124 is attempting to return the interaction 124 to a positive state; while words like "great" may indicate that the interaction is going very well.

The interaction modeler 114 develops a dynamic model, the interaction model 116, of the interaction 124 based on the behavioral cues 132 gleaned from the verbal and/or non-verbal inputs 128, 130, which are captured over the course of the interaction 124. By "dynamic," we mean a model that can account for the non-stationarity of human interactions as the interactions evolve over time. Additionally, the illustrative interaction modeler 114 applies a "data-driven" approach to "learn" or "discover" characteristic or salient patterns of cues expressed during the interaction 124, whether or not they are explicitly stated. This approach differs from others that merely applies "top down" or static human-generated heuristic rules to the collected data. That is not to say that heuristic rules may not be used at all by the interaction modeler 114; rather, such rules may be utilized in some embodiments. However, the "bottom-up" approach of the illustrative interaction modeler 114 allows the interaction model 116 to be developed so that it can be contextualized and personalized for each of the different participants 120, 122, based on the data obtained during the interaction 124. For instance, whereas a heuristic rule-based system might always characterize looking away as an indicator of mind-wandering, such behavior might indicate deep thinking in some participants and distraction in others, at least in the context of the instant interaction 124. These types of finer-grain distinctions in the interpretation of human behavior can be revealed by the interaction modeler 114 using the interaction model 116.

The interaction modeler 114 enables modeling of the interaction 124 within its context, as it evolves over time, rather than a series of snapshot observations. To do this, the illustrative interaction modeler 114 applies techniques that can model the temporal dynamics of the multi-modal data captured during the interaction 124. In the illustrated embodiments, discriminative modeling techniques such as Conditional Random Fields or CRFs are used. In other embodiments, generative models (such as Hidden Markov Models or HMMs) or a combination of discriminative and generative models may be used to model certain aspects of the interaction 124. For example, in some embodiments, HMMs may be used to identify transition points in the interaction (such as conversational turns or the beginning or end of a phase of the interaction), while CRFs may be used to capture and analyze the non-stationarity of the behavioral cues during the segments of the interaction identified by the HMMs.

The interaction modeler 114 applies the CRFs and/or other methods to recognize one or more temporal interaction sequences, each of which includes a pattern of the behavioral cues 132 occurring during the interaction 124. We use the term "temporal interaction sequence" generally to refer to any pattern or sequence of behavioral cues expressed by any of the participants 120, 122 or combination of participants over a time interval during the interaction 124, which is captured and recognized by the interaction assistant 110. In other words, a temporal interaction sequence can be thought of as a "transcript" of a pattern or sequence of the low-level features captured by the sensing device(s) 126 over the course of the interaction 124. Different temporal interaction sequences can occur simultaneously or overlap, as may be the case where one temporal interaction sequence involves behavioral cues of one participant and another involves behavioral cues of another participant occurring at the same time.

In some embodiments, the interaction modeler 114 recognizes and annotates or labels the temporal interaction sequences over multiple time scales, where a time scale is defined by an interval of time whose size can be compared to the size of other time intervals of the interaction 124. Moreover, in some embodiments, the interaction modeler 114 learns the associations, correlations and/or relationships between or among the behavioral cues 132 across multiple modalities, as well as their temporal dynamics, in an integrated fashion, rather than analyzing each modality separately. As such, the interaction modeler 114 can derive an assessment of each participant's behavioral state based on a combination of different multi-modal data, at various points in time and over different temporal sequences of the interaction 124.

The illustrative interaction modeler 114 is embodied as a number of different behavioral modeling sub-modules or sub-systems, including an affect analyzer 160, a natural language understanding (NLU) system 162, a temporal dynamics analyzer 164, an interpersonal dynamics analyzer 166, and a context analyzer 168, which analyze the temporal interaction sequences of behavioral cues 132. These analyzers can evaluate relationships and dependencies between and/or among the various behavioral cues 132, which may be revealed by the CRFs and/or other modeling techniques, in a variety of different ways. As a result of these analyses, each of the temporal interaction sequences may be annotated with one or more labels that describe or interpret the temporal interaction sequence. For example, whereas the feature classifiers 152 may provide low- or mid-level labels such as "smile," "frown," "handshake," etc., the interaction modeler 114 applies higher-level descriptive or interpretive labels to the multi-modal data, such as "greeting ritual," "repair phase," "concluding ritual," "amicable," "agitated," "bored," "confused," etc., and/or evaluative labels or assessments such as "successful," "unsuccessful," "positive," "negative," etc. Such annotations may be stored in the interaction model 116 and/or otherwise linked with the corresponding behavioral cues and temporal interaction sequences derived from the inputs 128, 130, e.g., as meta tags or the like.

The affect analyzer 160 analyzes the various combinations of behavioral cues 132 that occur during the temporal interaction sequences. For instance, the affect analyzer 160 considers combinations of behavioral cues 132 that occur together, such as head pose, facial expression, and verbal content, and their interrelationships, to determine the participant's likely behavioral, emotional, or cognitive state. In the illustrative embodiments, such determinations are based on the integrated combination of cues rather than the individual cues taken in isolation. The illustrative affect analyzer 160 also analyzes the temporal variations in each of the different types of behavioral cues 132 over time. In some cases, the affect analyzer 160 compares the behavioral cues 132 to a "neutral" reference (e.g., a centroid). In this way, the affect analyzer 160 can account for spontaneous behavior and can detect variations in the intensities of the behavioral cues 132.

The NLU system 162 parses and semantically analyzes and interprets the verbal content of the verbal inputs 130 that have been processed by the ASR system 150. In other words, the NLU system 162 analyzes the words and/or phrases produced by the ASR system 150 and determines the meaning most likely intended by the speaker given the previous words or phrases spoken by the participant or others involved in the interaction. For instance, the NLU system 162 may determine, based on the verbal context, the intended meaning of words that have multiple possible definitions (e.g., the word "pop" could mean that something has broken, or may refer to a carbonated beverage, or may be the nickname of a person, depending on the context). Some examples of NLU components that may be used in connection with the interaction assistant 110 include the GEMINI Natural-Language Understanding System and the SRI Language Modeling Toolkit, both available from SRI International.

The affect analyzer 160 and/or the NLU system 162 may annotate the multi-modal data and such annotations may be used by the temporal, interpersonal and context analyzers 164, 166, 168 for analysis in the context of one or more temporal interaction sequences. That is, each or any of the analyzers 164, 166, 168 may analyze temporal patterns of the non-verbal cues and verbal content. For instance, if the verbal content of one participant includes the word "sorry" at the beginning of an interaction and the word "great" at the end of the interaction, the results of the temporal analysis performed by the analyzer 164 may be different than if "great" occurred early in the interaction and "sorry" occurred later. Similarly, an early smile followed by a frown later might be interpreted differently by the analyzer 164 than an early frown followed by a later smile.

The temporal dynamics analyzer 164 analyzes the patterns of behavioral cues 132 of the participants 120, 122 to determine how the behavior or "state" (e.g., a combination of behavioral cues captured at a point in time) of each participant changes over time during the interaction 124. To do this, the temporal dynamics analyzer 164 examines the temporal interaction sequences and compares the behavioral cues 132 that occur later in the temporal sequences to those that occurred previously. The temporal dynamics analyzer 164 also considers the time interval in which behavioral cues occur in relation to other time intervals. As such, the temporal dynamics analyzer 164 can reveal, for example, whether a participant appears to be growing impatient or increasingly engaged in the interaction 124 over time.

The interpersonal dynamics analyzer 166 analyzes the patterns of behavioral cues 132 to determine how the behavior or "state" of each participant 120, 122 changes in response to the behavior of others. To do this, the interpersonal dynamics analyzer 166 considers temporal sequences of the behavioral cues 132 across multiple participants. For instance, a temporal interaction sequence may include a frown and tense body posture of one participant, followed by a calm voice of another participant, followed by a smile of the first participant. From this pattern of behavioral cues, the interpersonal dynamics analyzer 166 may, for example, identify the behavioral cues of the second participant as significant in terms of their impact on the nature or efficacy of the interaction 124 as a whole.

The context analyzer 168 analyzes the patterns of behavioral cues 132 to determine how the overall context of the interaction 124 influences the behavior of the participants 120, 122. In other words, the context analyzer 168 considers temporal interaction sequences that occur over different time scales, e.g., over both short term and long range temporal segments of the interaction 124. Whereas a "time interval'" refers generally to any length of time between events or states, or during which something exists or lasts, a time scale or temporal granularity connotes some relative measure of duration, which may be defined by an arrangement of events or occurrences, with reference to at least one other time scale. For instance, if the time scale is "seconds," the time interval might be one second, five seconds, thirty seconds, etc. Similarly, if the time scale is "minutes," the time interval may be one minute, ten minutes, etc. As a result, the context analyzer 168 may consider a frown as more significant to an interaction 124 that only lasts a minute or two, but less significant to an interaction that lasts ten minutes or longer.

In some embodiments, the time scale(s) used by the context analyzer 168 are not predefined or static (such as minutes or seconds) but dynamic and derived from the behavioral cues 132 themselves. That is, the time scale(s) can stem naturally from the sensed data. In some cases, the time scale(s) may correspond to one or more of the temporal interaction sequences. For example, a temporal interaction sequence at the beginning of an interaction may include a smile and a handshake by one participant followed by a smile and a nod by another participant and both participants sitting down. Another temporal interaction sequence may include the behavioral cues of the first interaction sequence and others that follow, up to a transition point in the interaction that is indicated by one or more subsequent behavioral cues (e.g., the participants stand up after having been seated for awhile). While the smiles may have significance to the first temporal interaction sequence, they may have lesser significance to the interaction as a whole when considered in combination with the behavioral cues of the second temporal interaction sequence. As an example, the interaction modeler 114 may detect from the first temporal interaction sequence that this appears to be a friendly meeting of two people. However, when the time scale of the first temporal interaction sequence is considered relative to the time scale of the second interaction sequence, the interaction modeler 114 may determine that the interaction is pleasant but professional in nature, indicating a business meeting as opposed to a casual meeting of friends.

In some embodiments, other indicators of the interaction context may be considered by the context analyzer 168. For instance, one or more of the sensing device(s) 126 may provide data that indicates whether the interaction is occurring indoors or outdoors, or that identifies the geographic location of the interaction. Such indicators can be derived from video clips, as described in the aforementioned U.S. patent application Ser. No. 13/737,607, or obtained from computerized location systems (e.g., a cellular system or global positioning system (GPS)) and/or other devices or components of the computing system 100, for example. The context analyzer 168 can consider these inputs and factor them into the interpretation of the behavioral cues 132. For instance, a serious facial expression may be interpreted differently by the interaction modeler 114 if the interaction 124 occurs in a boardroom rather than at an outdoor party. As another example, if some of the behavioral cues 132 indicate that one participant to the interaction 124 looks away while another participant is talking, the context analyzer 168 may analyze other behavioral cues 132 and/or other data to determine whether it is more likely that the first participant looked away out of boredom (e.g., if the speaker has been speaking on the same topic for several minutes) or distraction (e.g., something occurred off-camera, such as another person entering the room).

The illustrative interaction model 116 is embodied as a graphical model that represents and models the spatio-temporal dynamics of the interaction 124 and its context. The model 116 utilizes hidden states to model the non-stationarity of the interaction 124. The model 116 is embodied as one or more computer-accessible data structures, arguments, parameters, and/or programming structures (e.g., vectors, matrices, databases, lookup tables, or the like), and may include one or more indexed or otherwise searchable stores of information. The illustrative model 116 includes data stores 170, 172, 174, 176, 178, 180 to store data relating to the behavioral cues 132, the temporal interaction sequences, and the interactions 124 that are modeled by the interaction modeler 114, as well as data relating to events, assessments, and semantic structures that are derived from the cues 132, temporal interaction sequences, and interactions 124 as described further below. The model 116 also maintains data that indicates relationships and/or dependencies between or among the various cues 132, sequences 172, and interactions 174.

The events data 176 includes human-understandable characterizations or interpretations (e.g., a semantic meaning) of the various behavioral cues and temporal interaction sequences. For example, a temporal interaction sequence including smiles and handshakes may indicate a "greeting ritual" event, while a temporal interaction sequence including a loud voice and waving arms may indicate an "agitated person" event. Similarly, the events data may characterize some behavioral cues as "genuine smiles" and others as "nervous smiles." The events data 176 can include identifiers of short-term temporal interaction sequences (which may also be referred to as "markers") as well as longer-term sequences. For example, a marker might be "eye contact" while a longer-term event might be "amicable encounter."

The assessments data 178 includes indications of the nature or efficacy of the interactions 124 as a whole and/or portions thereof, which are derived from the temporal interaction sequences. For example, the nature of the interaction 124 might be "businesslike" or "casual" while the efficacy might be "successful" or "unsuccessful," "positive" or "negative," "good" or "poor." The semantic structures 180 include patterns, relationships and/or associations between the different events and assessments that are derived from the temporal interaction sequences. As such, the semantic structures 180 may be used to formulate statements such as "a pleasant conversation includes smiles and nods of the head" or "hands at sides indicates relaxed." Indeed, the semantic structures 180 may be used to develop learned rules for the interaction 124, as described further below.

The interaction model 116 can make the assessments, semantic structures, and/or other information stored therein accessible to one or more of the application modules 118, for various uses. Some examples of application modules 118 include a suggestion module 190, a dialog module 192, a prediction module 194, a description module 196, and a learned rules module 198. In some embodiments, the modules 118 may be integrated with the interaction assistant 110 (e.g., as part of the same "app"). In other embodiments, one or more of the application modules 118 may be embodied as separate applications (e.g., third-party applications) that interface with the interaction assistant 110 via one or more electronic communication networks.

The illustrative suggestion module 190 evaluates data obtained from the interaction model 116 and generates suggestions, which may be presented to one or more of the participants 120, 122 and/or others (e.g., researchers and other human observers) during and/or after the interaction 124. To do this, the suggestion module 190 may compare patterns of cues, events, and/or assessments to stored templates and/or rules. As an example, the suggestion module 190 may compare a sequence of behavioral cues to a template and based thereon, suggest that a participant remove his or her glasses or adjust his or her body language to appear more friendly. The suggestions generated by the suggestion module 190 may be communicated to the participants and/or others in a variety of different ways, such as text messages, non-text electronic signals (such as beeps or buzzers), and/or spoken dialog (which may include machine-generated natural language or pre-recorded human voice messages).

The illustrative dialog module 192 evaluates data obtained from the interaction model 116 in the context of a natural language dialog between a human participant and a virtual character of a software application running on an electronic computing device. For example, the dialog module 192 may be embodied in a VPA or other type of dialog-based interactive software application or user interface, or a video game or simulation. In a VPA, typically, the user's natural-language dialog input is processed and interpreted by ASR and NLU systems, and a reasoner module monitors the current state and flow of the dialog and applies automated reasoning techniques to determine how to respond to the user's input. The reasoner module may interface with an information search and retrieval engine to obtain information requested by the user in the dialog. A natural language generator formulates a natural-language response, which is then presented to the user (e.g., in text or audio form). Virtual personal assistants are commercially available; some examples of techniques for implementing a VPA are described in Patent Cooperation Treaty Patent Application Publication No. WO2011028844 (Method and Apparatus for Tailoring the Output of an Intelligent Automated Assistant to a User).

The illustrative dialog module 192 uses the interaction data (e.g., cues, events, assessments, etc.) to determine how to interpret and/or respond to portions of the dialog that are presented to it by the human participant. For instance, the dialog module 192 may utilize an assessment of the interaction 124 to determine that the participant's remarks were intended as humor rather than as a serious information request, and thus a search for substantive information to include in a reply is not needed. As another example, the dialog module 192 may use event or assessment data gleaned from non-verbal cues to modulate its response. That is, e.g., if based on the data the participant appears to be confused or frustrated, the dialog module 192 may select different words to use in its reply, or may present its dialog output more slowly, or may include a graphical representation of the information in its reply. In some embodiments, the dialog module 192 may utilize information from multiple time scales to attempt to advance the dialog in a more productive fashion. For example, if the sequences 172 indicate that the user appeared to be more pleased with information presented earlier in the dialog but now appears to be getting impatient, the dialog module 192 may attempt to return the dialog to the pleasant state by, perhaps, allowing the user to take a short break from the dialog session or by re-presenting information that was presented to the user earlier, which seemed to have generated a positive response from the user at that earlier time.

The illustrative prediction module 194 operates in a similar fashion to the suggestion module 190 (e.g., it compares patterns of the events data 176, assessment data 178, and the like to stored templates and/or rules). However, the prediction module 194 does this to determine cues or events that are likely to occur later in the interaction 124. For example, the prediction module 194 may determine that if one participant continues a particular sequence of cues for several more minutes, another participant is likely to get up and walk out of the room. Such predictions generated by the module 194 may be presented to one or more of the participants 120, 122 and/or others, during and/or after the interaction 124, in any suitable form (e.g., text, audio, etc.).

The illustrative description module 196 generates a human-intelligible description of one or more of the assessments that are associated with the interaction 124. That is, whereas an assessment indicates some conclusion made by the interaction assistant 110 about the interaction 124 or a segment thereof, the description generally includes an explanation of the reasons why that conclusion was made. In other words, the description typically includes a human-understandable version of the assessment and its supporting evidence. For example, if an assessment of an interaction is "positive," the description may include a phrase such as "this is a positive interaction because both participants made eye contact, smiled, and nodded." In some embodiments, the description generated by the description module 196 may include or be referred to as a recounting. Some techniques for generating a recounting are described in the aforementioned U.S. patent application Ser. No. 13/737,607.

The illustrative learned rules module 198 generates rules based on the semantic structures 180. It should be appreciated that such rules are derived from the actual data collected during the interaction 124 rather than based on heuristics. Some examples of such learned rules include "speaking calmly in response to this participant's agitated state will increase [or decrease] the participant's agitation" or "hugging after shaking hands is part of this participant's greeting ritual." Such learned rules may be used to update the interaction model 116, for example. Other uses of the learned rules include training and coaching applications (e.g., to develop a field guide or manual for certain types of interactions or for interactions involving certain topics or types of people).

In general, the bidirectional arrows connecting the interaction modeler 114 and the application modules 118 to the interaction model 116 are intended to indicate dynamic relationships therebetween. For example, the interaction model 116 may be updated based on user feedback obtained by one or more of the application modules 118. Similarly, updates to the interaction model 116 can be used to modify the algorithms, parameters, arguments and the like, that are used by the interaction modeler 114. Further, regarding any information or output that may be generated by the application modules 118, such data may be stored (e.g., in storage media of the computing system 100) for later use or communicated to other applications (e.g., over a network), alternatively or in addition to being presented to the participants 120, 122 or users of the system 100.

Figure 2:
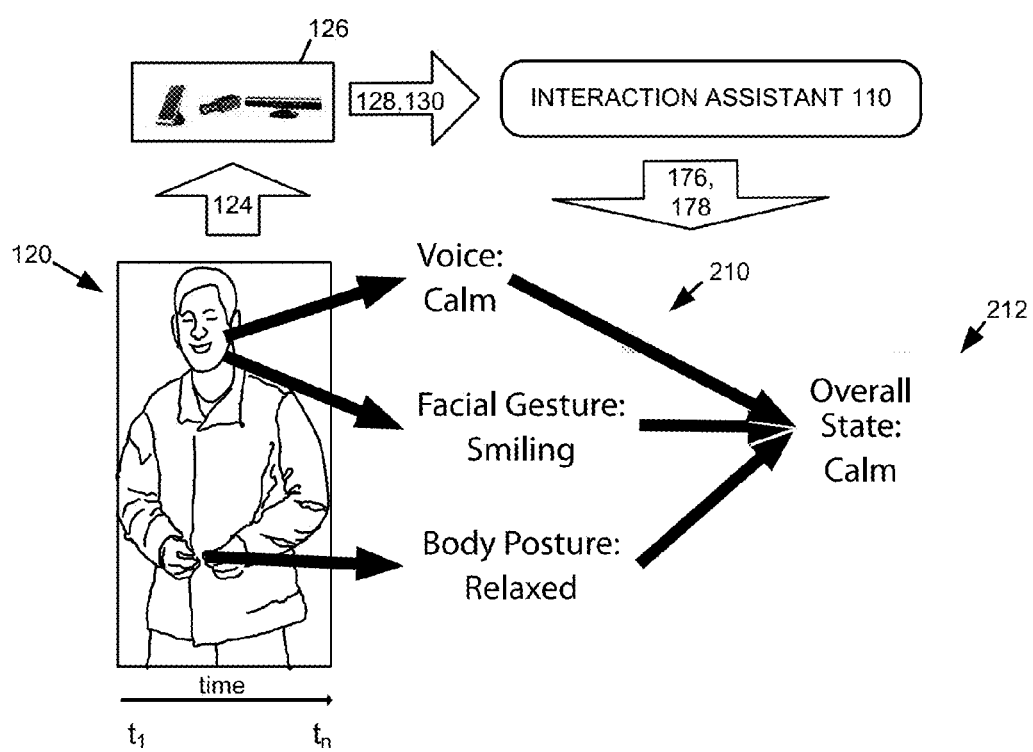
FIG. 2 is a simplified illustration of the operation of at least one embodiment of the interaction assistant of FIG. 1 to process multi-modal data of a participant during an interaction.

Referring now to FIG. 2, an illustration of instances of events 210 and an instance of an assessment 212 that may be generated by the interaction assistant 110 is shown. The participant 120 is observed by one or more of the sensing devices 126 over time during the interaction 124. The non-verbal and verbal inputs 128, 130 (e.g., voice tone, facial expression, body pose, gaze) are analyzed by the interaction assistant 110. As a result of its analysis, the interaction assistant 110 generates the instances 210, 212 of the events 176 and assessments 178 based on the inputs 128, 130. Over the illustrated temporal sequence $t_1$ to $t_n$, the interaction assistant 110 has determined the following instances of event data 210: the participant's voice tone appears to be calm, the participant appears to be smiling, and the participant's posture appears to be relaxed. Based on the event data 210, the interaction assistant 110 has concluded that the participant's overall assessment (e.g., behavioral or emotional state 212) during the interaction 124 is "calm."

Figure 3:
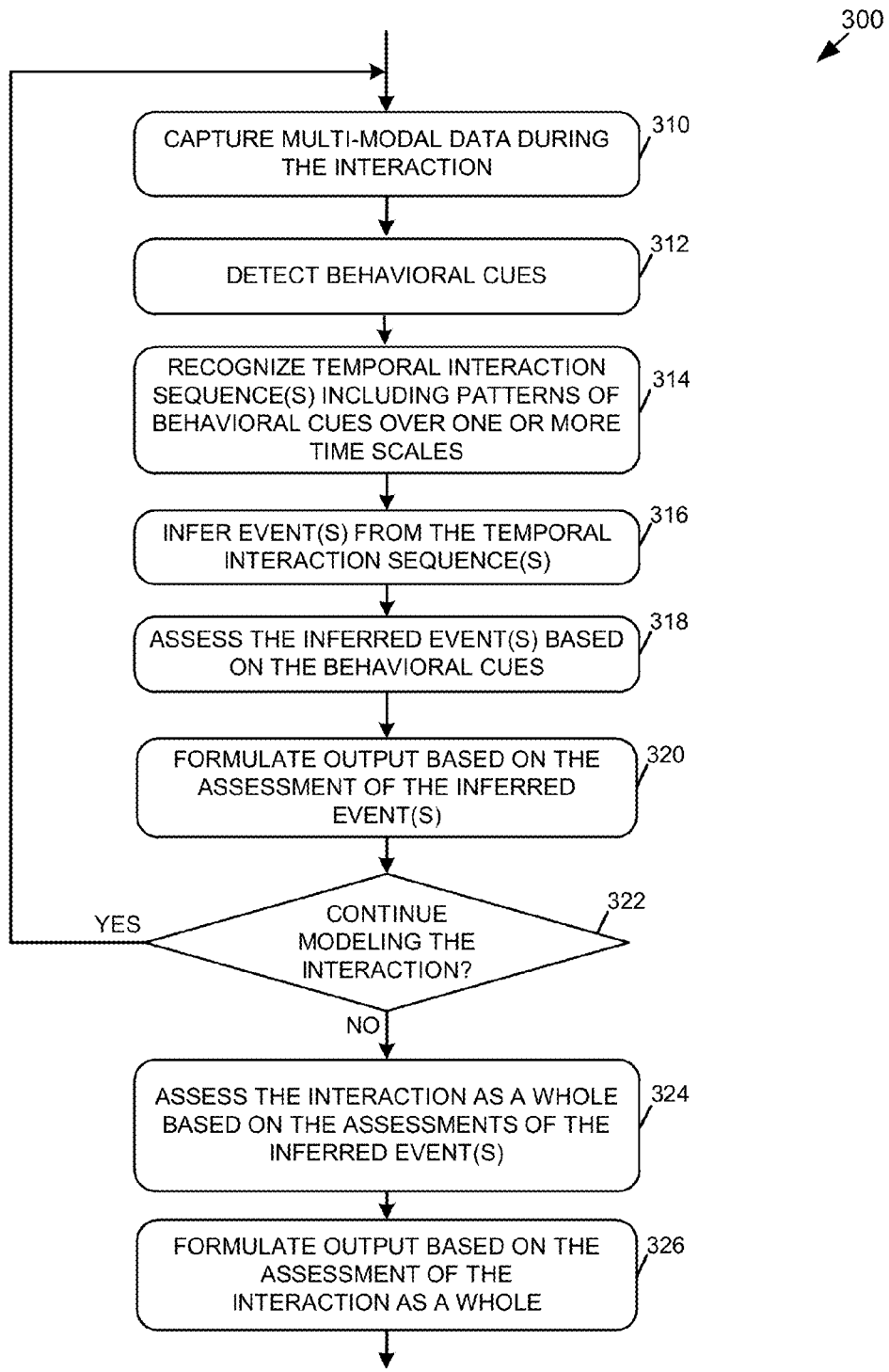
FIG. 3 is a simplified flow diagram of at least one embodiment of a method by which the interaction assistant of FIG. 1 may analyze an interaction.

Referring now to FIG. 3, an illustrative method 300 for assessing the interaction 124 is shown. The method 300 may be embodied as computerized programs, routines, logic and/or instructions of the interaction assistant 110, for example. At block 310, the method 300 captures the multimodal data during the interaction 124, using the sensing device(s) 126 as described above. At block 312, the method 300 detects the behavioral cues 132 expressed by the participants 120, 122 during the interaction 124, by analyzing the inputs 128, 130 as described above. At block 314, the method 300 analyzes the behavioral cues 132 and recognizes therefrom one or more temporal interaction sequences, each of which includes a pattern of the behavioral cues 132 that occurs over one or more time scales. To do this, the method 300 uses modeling techniques that can identify temporal relationships and/or dependencies between or among the cues 132, such as conditional random fields. In some embodiments, hidden-state CRFs are used, in order to capture meaningful semantic patterns of the cues 132 that may not otherwise be apparent from the data. In some embodiments, hierarchical CRFs and/or other methods may be used to capture the temporal interaction sequences at multiple different time scales. In some embodiments, Hidden Markov Models and/or other techniques may be used to identify likely transition points in the interaction 124 (e.g., a transition from a pleasant interaction to an argument or vice-versa).

At block 316, the method 300 infers one or more event(s) from the temporal interaction sequences based on the behavioral cues 132 corresponding thereto. For example, the method 300 may infer that a temporal sequence likely represents a "greeting" or a "repair" phase of the interaction, or that a particular combination of behavioral cues represents a "genuine smile." To do this, the illustrative method 300 uses probabilistic or statistical modeling to analyze the sequences in comparison to other sequences that have previously been analyzed and assessed. For example, the method 300 may generate a probabilistic and/or statistical likelihood that a temporal interaction sequence is similar to other sequences that have been previously classified, as corresponding to, e.g., a greeting phase of an interaction or a genuine smile.

At block 318, the method 300 analyzes the inferred events of block 316 to formulate an assessment of the nature and/or efficacy of the event(s). To do this, the method 300 analyzes the behavioral cues 132 associated with the event(s) in terms of whether they are likely representative of, e.g., a successful or unsuccessful interaction, or casual or businesslike encounter. For example, the method 300 may utilize probabilistic and/or statistical modeling to assess the nature and/or efficacy of the event(s) and the associated cues 132 in comparison to those of other event(s) that have previously been analyzed and assessed. For example, the method 300 may generate a probabilistic or statistical likelihood that a greeting ritual has been successfully executed based on other examples of greeting rituals that have been classified as successful. At block 320, the method formulates output based on the assessment of the inferred event(s). Such output may include the data (e.g., probabilistic or statistical values, scores, or rankings) that is stored in the interaction model 116 and may be used by the application module(s) 118. At block 322, the method 300 determines whether to continue modeling the interaction 124. In some cases, modeling may continue until the interaction 124 has concluded, while in other instances, modeling may end after a particular phase or segment of the interaction 124 has been reached. If modeling is to continue, the method 300 returns to block 310. If modeling is completed, the method 300 proceeds to block 324.

At block 324, the method 300 assesses the interaction as a whole based on the event assessments generated at block 318. To do this, the method 300 utilizes discriminative modeling techniques that can account for longer-term temporal dynamics and/or multiple time scales (e.g., CRFs) as described above. At block 326, the method 300 formulates output based on its assessment of the interaction as a whole. In other words, the method 300 generates a "holistic" assessment of the interaction. By holistic, we mean, generally, an evaluation of the nature or efficacy of the interaction as a whole, based on one or more of the temporal interaction sequences. For example, the holistic assessment may be based on a number of different temporal interaction sequences including one that indicates an adequate greeting ritual and others that indicate smiling by all participants throughout the interaction. Based on the analysis of one or more temporal interaction sequences occurring over the course of the entire interaction, the holistic assessment may represent a conclusion that the interaction as a whole was, e.g., pleasant, unpleasant, successful, unsuccessful, positive, negative, hurried, relaxed, etc. Such output is stored in the interaction model 116 and may be used by one or more of the application module(s) 118 as described above.

Figure 4:
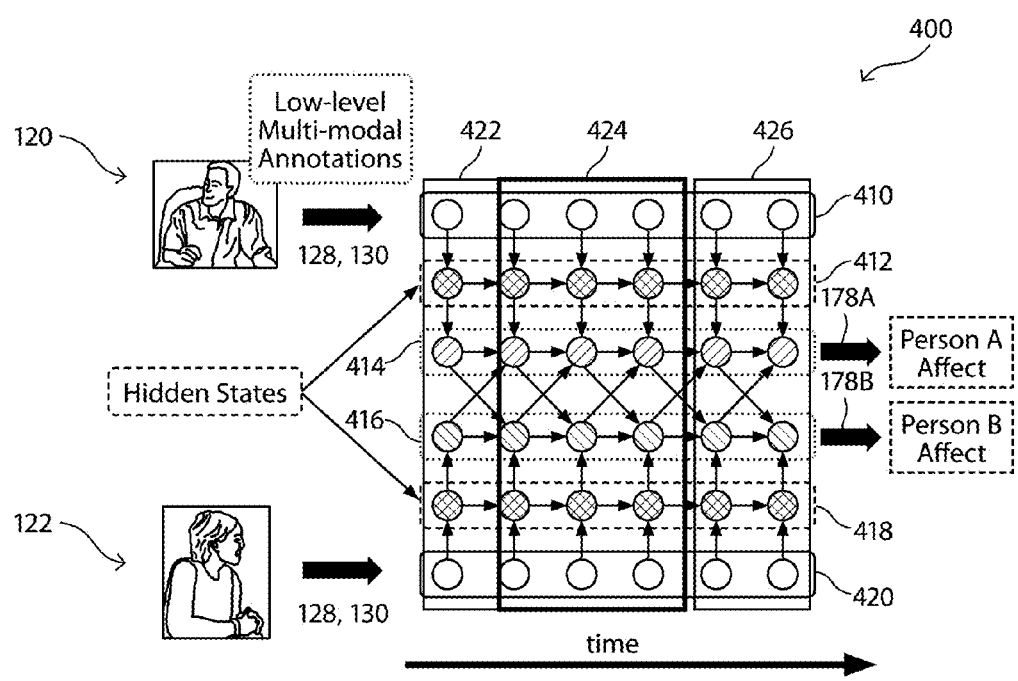
FIG. 4 is a simplified illustration of at least one embodiment of an interaction model that may be used in connection with the interaction assistant of FIG. 1.

Referring now to FIG. 4, an illustration of an embodiment 400 of the interaction model 116, corresponding to the interaction 124 involving the participants 120, 122, is shown. As described above, verbal and non-verbal inputs 128, 130 are captured through observation of the participants 120, 122 by one or more sensing device(s) 126 over time during the interaction 124, and the model 400 is developed therefrom by the interaction modeler 114. The model 400 includes graphical representations of each of the participant's behavioral states (represented by circles) as they occur and change over time. Each of these states is derived from the multi-modal data; that is, each circle represents an overall state that is determined based on a combination of behavioral cues from different modalities.

For example, as in FIG. 2, the participant's overall state of "calm" may be derived from a combination of voice, facial expression, and posture.

The model 400 also graphically illustrates associations, dependencies and/or relationships between and among the various states (represented by arrows). For example, the arrows connecting the circles of the temporal sequences 414, 416 represent associations, dependencies and/or relationships between the states of the two participants, which, in combination with the user state information, can be used to analyze the impact of one participant's state on the state of the other participant and vice versa. Further, the model 400 illustrates both participant-specific and cross-participant temporal interaction sequences (represented illustratively by rectangular blocks). For example, the blocks 410, 412, 414 include sequences of states of the participant 120 over time, while the blocks 416, 418, 420 include sequences of states of the participant 122 over time. Additionally, the blocks 422, 424, 426 include temporal sequences involving both of the participants 120, 122. As shown by the block 424, the temporal interaction sequences can overlap in time (e.g., portions of block 424 overlap with block 422. Such may be the case if, for example, one participant begins talking before the other participant has finished speaking, or if one participant's expression changes while the other participant is talking. This is possible because the durations of the temporal interaction sequences can be defined by the behavioral cues themselves rather than imposed thereon. More generally, a temporal interaction sequence can traverse any path through the states identified in the model and as such, may include directly observed states, hidden states, states of multiple participants occurring at the same time and/or at different times, etc. For example, each of the blocks 422, 424, 426 includes a number of different possible temporal interaction sequences, with each sequence being defined by a different path through the states represented in the model 400. Some of these sequences may have significance to the analyses performed by the interaction modeler 114, e.g., with respect to the participants' behavioral states or to the assessments of the interaction 124, while others may not. Using the model 400, the interaction modeler 114 can make estimations as to the likelihood that each of the various temporal interaction sequences has significance (e.g., whether a sequence represents a salient pattern of behavioral cues) to the interaction 124. For example, in some embodiments, the temporal interaction sequences are compared to one another and/or to interaction templates as described herein.

In the model 400, the blocks 410, 414, 416, and 420 include observable states, while the blocks 412, 418 include hidden states. In the illustrative model 400, the hidden states are revealed by the modeling technique, e.g., by the application of hidden-state conditional random fields. In some cases, the hidden states can represent meaningful details that would otherwise not be apparent, such as the degree of intensity of a participant's state. For example, in some cases, hidden states may be used to reveal adverbs that can be used to describe the participant's state, as opposed to adjectives. These estimations of intensity can be used to recognize temporal interaction sequences (e.g., a "genuine" greeting as compared to a "staged" greeting). As another example, hidden states can be used to add flexibility to the interaction model 116. For instance, two sequences of behavioral cues may include eye contact, smiles and handshakes, but not in exactly the same temporal order (e.g., eye contact, smile, handshake or smile, handshake, eye contact), and hidden states may be used to identify both of these sequences as greeting rituals. Various aspects of the model 400 can be used to generate holistic assessments 178A, 178B of each of the participant's affective state.

Figure 5:
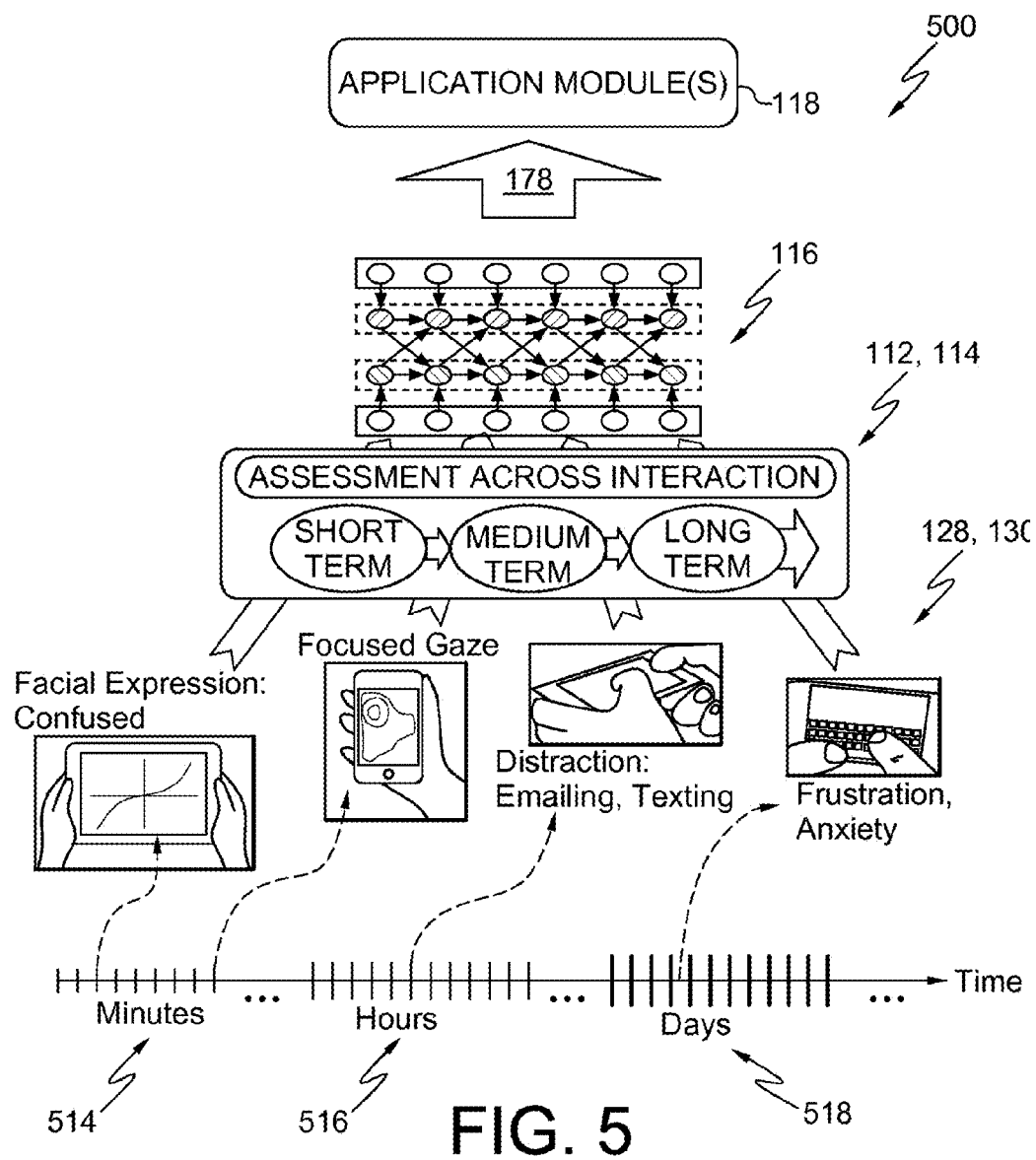
FIG. 5 is a simplified illustration of at least one embodiment of the interaction assistant of FIG. 1, showing the interaction assistant analyzing human interactions involving a computing device, over multiple time scales.

Referring now to FIG. 5, an illustration of a multi-modal analysis of a human-device interaction over multiple time scales by an embodiment 500 of the interaction assistant 110 is shown. In the illustration, a human participant is interacting with a mobile electronic device. The mobile electronic device is equipped with its own sensing device(s) (e.g., a two-way camera), which are used to capture the non-verbal and verbal inputs 128, 130 during the participant's use of the device. The multi-modal feature analyzer 112 and the interaction modeler 114 detect and analyze the behavioral cues expressed by the participant over multiple time scales 514, 515, 518. In the illustrated embodiment, the time scale 514 corresponds to short-term temporal interaction sequences, while the time sale 516 corresponds to medium-term temporal interaction sequences and the time scale 518 corresponds to longer-term temporal interaction sequences. The temporal interaction sequences and results of the analysis thereof (e.g., the assessments 178) are stored in the interaction model 116. The assessments 178 are made available for use by one or more of the application module(s) 118 as described above.

In the illustration of FIG. 5, the participant's behavioral cues over the short term, as detected by the sensing device(s) 126 and analyzed by the interaction assistant 110, indicate confusion in connection with the use of a particular software application (based, e.g., on the detected facial expression). The interaction assistant 110 then interfaces with an application module 118 to determine how the software application should respond. A few minutes later, the interaction assistant 110 detects that the user is fully engaged with the software application (based, e.g., on the detected location and/or duration of the user's gaze). Moving to a medium term time scale, the interaction assistant 110 detects over a period of hours that the user tends to become distracted while using the software application. At this point, the interaction assistant 110 may interface with the application module 118 to determine an appropriate response (e.g., an audible or visual reminder), which may also take into consideration the user's earlier confusion. Further, over a longer term time scale, the interaction assistant 110 may observe that the participant tends to become frustrated or anxious when certain information is presented by the computing device, and interface with the application module 118 to formulate an appropriate response, and such response may take into consideration the behavioral cues that were expressed at the other time scales. For example, the interaction assistant 110 may present information in a similar fashion as was done earlier in the short term, based on its assessment of the short-term interaction as having ended successfully.

Human emotions can be subtle and complex, and can span across multiple modalities such as paralinguistics, facial expressions, eye gaze, various hand gestures, head motion and posture. Each modality contains useful information on its own, and humans typically employ a complex combination of cues from each of these modalities to interpret fully the emotional state of a person. The interactions between multiple modalities combined with the distinctive temporal variations of each modality make automated human emotion recognition an extremely challenging problem.

To address this problem, some embodiments employ an approach that utilizes both audio and visual cues for emotion recognition. To fuse temporal data from multiple modalities effectively, these embodiments perform dimensionality reduction on the low-level audio and video features collected using one or more of the sensing device(s) 126 and then apply a Hidden Conditional Random Field to the low-level dimensional features for emotion recognition. A Joint Hidden Conditional Random Field (JHCRF) model is used to fuse the temporal data from multiple modalities, in some embodiments. In other embodiments, other techniques, such as early and late fusion, may be used.

Figure 6:
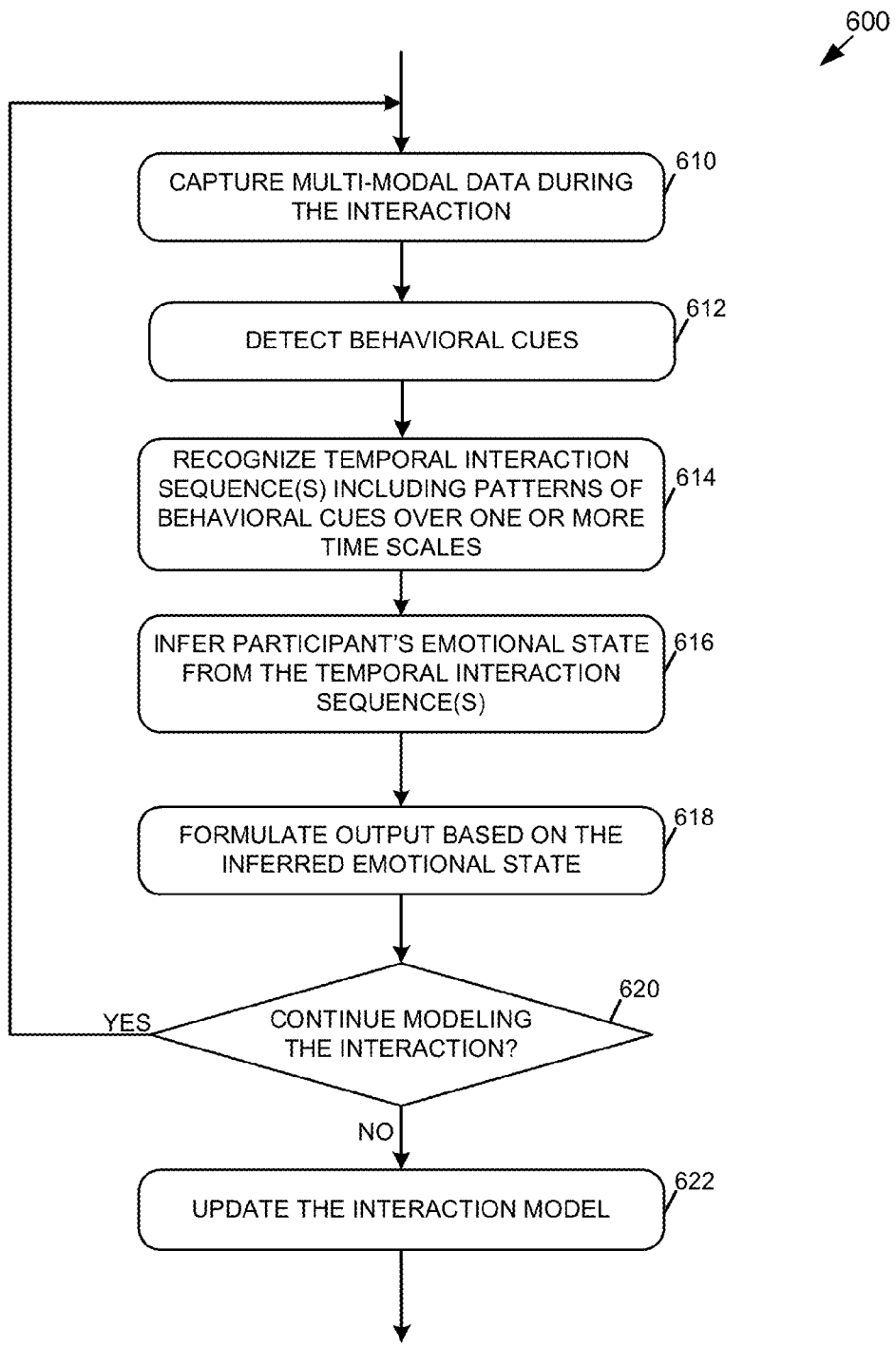
FIG. 6 is a simplified flow diagram of at least one embodiment of a method by which the interaction assistant of FIG. 1 may analyze the emotional state of a participant in an interaction.

Referring now to FIG. 6, an illustrative method 600 for assessing the emotional state of one or more of the participants 120, 122 over the course of the interaction 124 is shown. The method 600 may be embodied as computerized programs, routines, logic and/or instructions of the interaction assistant 110. At block 610, the method 600 captures the multi-modal data during the interaction 124, using the sensing device(s) 126 as described above. More specifically, in some embodiments, the method 600 extracts features from the audio and visual data of a video stream, such as a video segment that may be recorded at a mobile computing device. The extracted audio features may include a number of different low-level descriptors, such as energy and spectral related low-level descriptors, voicing-related low-level descriptors, and delta coefficients of the energy and/or spectral features. The extracted video features may include the locations of the face and eye coordinates. The extraction of these features may be performed using, for example, the OpenCV implementation of the Viola-Jones face/eye detectors. Dimensionality reduction may be performed on both the audio and video features using, e.g., a Partial Least Squares technique, Support Vector Machines, and/or other suitable statistical techniques.

At block 612, the method 600 detects the behavioral cues 132 expressed by the participants 120, 122 during the interaction 124, by analyzing the inputs 128, 130 as described above. At block 614, the method 300 analyzes the behavioral cues 132 and recognizes therefrom one or more temporal interaction sequences, each of which includes a pattern of the behavioral cues 132 that occurs over one or more time scales. At block 616, the method 600 infers the emotional state of one or more of the participants 120, 122 from the temporal interaction sequences, based on the behavioral cues 132 corresponding thereto. To perform the processes of blocks 612, 614, 616, the method 600 uses modeling techniques that can identify temporal relationships and/or dependencies between or among the cues 132, such as various types of conditional random fields. In some embodiments, hidden-state CRFs are used, in order to capture meaningful semantic patterns of the cues 132 that may not otherwise be apparent from the data. In some embodiments, hierarchical CRFs and/or other methods may be used to capture the temporal interaction sequences at multiple different time scales.

In some embodiments, a Joint Hidden Conditional Random Field (JHCRF) technique is used for discriminative sequence labeling based on fusing the temporal data from multiple modalities. The disclosed JHCRF technique enables discriminative learning, the ability to utilize arbitrary features, and the ability to model non-stationarity. The disclosed JHCRF technique can effectively fuse data from multiple modalities while also simultaneously modeling the temporal dynamics of the data.

A simplified discussion of our JHCRF approach refers to two modalities (the extension to more than two modalities being straightforward). We assume a set of n temporal interaction sequences, which include data from two different modalities X and Y, and each modality X and Y has i number of multi-modal temporal sequences of length T. Corresponding to each sequence $X_i(Y_i)$, we have a sequence of labels $W_i$, where each label of each sequence $W_i$ is in a set of labels, C.

Briefly, CRFs model the conditional distribution over the label sequence. The performance of CRFs can be improved by introducing hidden variables. The hidden variables model the latent structure, increasing the representational power of the model and improving discriminative performance. Our JHCRF model assigns a label to each node of the sequence. Given our two observation sequences $X_i$ and $Y_i$ corresponding to two different modalities, we introduce a sequence of hidden variables $H_x(H_y)$, corresponding to each observation sequence $X_i(Y_i)$. The Joint Hidden CRF is defined as:

$$p(W \mid X, \theta) = \frac{1}{Z(X, H, W, \theta)} \sum_H \exp(\Psi(X, H, W; \theta))$$

where H includes both $H_x$ and $H_y$, $\theta$ are the model parameters, $\Psi$ is the potential function, and Z (X, W, $\theta$) is the partition function that ensures that the model is properly normalized. The partition function remains the same as in HCRFs, while the potential function is modified as follows:

$$\Psi(X, H, W; \theta) = \sum_j \theta_i^{t,1} T_j^1(w_{i-1}, w_i, X, Y, i) + \sum_j \theta_j^{t,2} T_j^2(h_i^x, w_i, X, i) + \sum_j \theta_j^3 T_j^3(h_i^y, w_i, Y, i) + \sum_k \theta_k^{s,1} S_k^1(h_i^x, X, i) + \sum_k \theta_k^{s,2} S_k^2(h_i^y, Y, i)$$

The potential function includes state features $S^1$ and $S^2$ corresponding to both sets of hidden states, as well as transition functions $T^1$ for transitions among the predicted states and $T^2$ and $T^3$ for transitions from the hidden states to the predicted states. As a result, our JHCRFs simultaneously model and learn the correlations between different modalities as well as the temporal dynamics of sequence labels. Learning and inference are performed by marginalizing over the hidden variables. In some embodiments, the JHCRFs, HCRFs and CRFs, as the case may be, may be implemented based on the Undirected Graphical Models (UGM) software.

At block 618, the method 600 formulates output based on the assessment of the emotional state of one or more of the participants 120, 122. Such output may include the data (e.g., probabilistic or statistical values, scores, or rankings) that is stored in the interaction model 116 and may be used by the application module(s) 118. For example, the emotional state information may be used to inform a software application that a participant is becoming frustrated with the currently displayed information.

At block 620, the method 600 determines whether to continue modeling the interaction 124. In some cases, modeling may continue until the interaction 124 has concluded, while in other instances, modeling may end after a particular phase or segment of the interaction 124 has been reached. If modeling is to continue, the method 600 returns to block 610. If modeling is completed, the method 600 proceeds to block 622. At block 622, the method 600 updates the interaction model (e.g., the model 116) with the information pertaining to the emotional state of the participant(s). Of course, the interaction model can be updated at any time during the method 600; it is shown here as block 622 for ease of illustration.

Example Usage Scenarios

Figure 7:
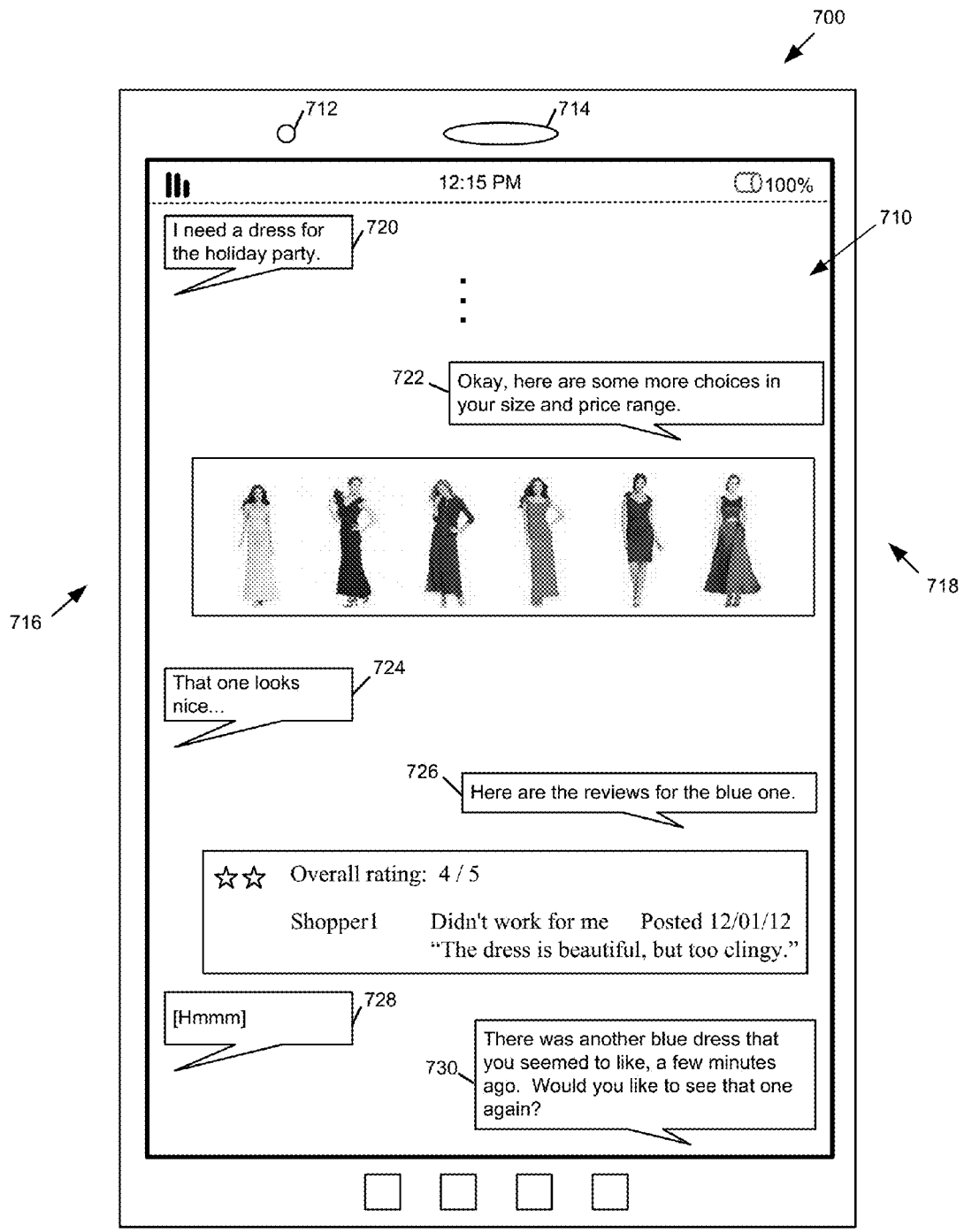
FIG. 7 illustrates an example of a user interaction with a computing device that may occur in connection with the use of at least one embodiment of the interaction assistant of FIG. 1.

The interaction assistant 110 has a number of different applications, including those discussed above in connection with the application modules 118 of FIG. 1. Referring now to FIG. 7, an example of an interaction that may be enhanced or at least informed by the interaction assistant 110 is shown. The interaction involves a person and a computing system 700. Illustratively, the computing system 700 is embodied as a mobile electronic device such as a smart phone, tablet computer, or laptop computer, in which a number of sensing devices 712, 714 are integrated (e.g., two-way camera, microphone, etc.). The interaction is illustrated as occurring on a display screen 710 of the system 700, however, all or portions of the interaction may be accomplished using audio, e.g., a spoken natural-language interface, rather than a visual display. The illustrated interaction may be performed by a virtual personal assistant component of the system 700 or other dialog-based software applications or user interfaces. The interaction involves user-supplied natural-language dialog 716 and system-generated dialog 718. In the illustrated example, the user initiates the interaction at box 720, although this need not be the case. (In other words, the interaction may be initiated proactively by the system 700 in some embodiments).

At box 720, the user issues a verbal statement. Using ASR and NLU components 150, 162, the system 700 interprets the user's statement as a search request for formal dresses. Subsequently, the system 700 and the user engage in multiple rounds of information search and retrieval over a period of time (the passage of time being represented in the illustration by " . . . "). For example, the system 700 presents a number of different choices, which the user reviews. From this temporal sequence, the interaction assistant 110 may conclude that the interaction is going well, as the user may be the type of person who prefers to consider many different options before making a decision. So, at box 722, the system 700 continues on with presenting additional choices for the user's consideration.

At box 724, the user offers (e.g., by text or voice) that "that one looks nice." From this, the NLU component 162 of the interaction assistant 110 understands that one of the choices meets with the user's approval, while the gaze-tracking component 146 allows the system 700 to determine that it is the blue dress at which the user's gaze is focused. Further, in consideration of the previous multiple rounds of dialog (or user-specific preferences gleaned from, e.g., previous interactions), the interaction assistant 110 concludes that it is now time to try to advance the conversation by providing more details about the blue dress on which the user's gaze is focused. As such, the system 700 retrieves the customer reviews for the blue dress and displays them to the user.

Following that, the system 700 detects a non-verbal vocal response from the user ("Hmmm") that it interprets as an indication that the user's opinion of the blue dress may have changed to neutral or negative based on the content of the reviews. In response to this, and in view of other sequences of the interaction that occurred previously, the system 700 attempts to restore the positive nature of the interaction by offering to re-present an earlier choice that the user seemed to like. Thus, by considering both verbal and non-verbal cues of temporal interaction sequences over multiple different time scales, the interaction assistant 110 can help the system 700 provide a more productive dialog experience for the user.

Implementation Examples

Figure 8:
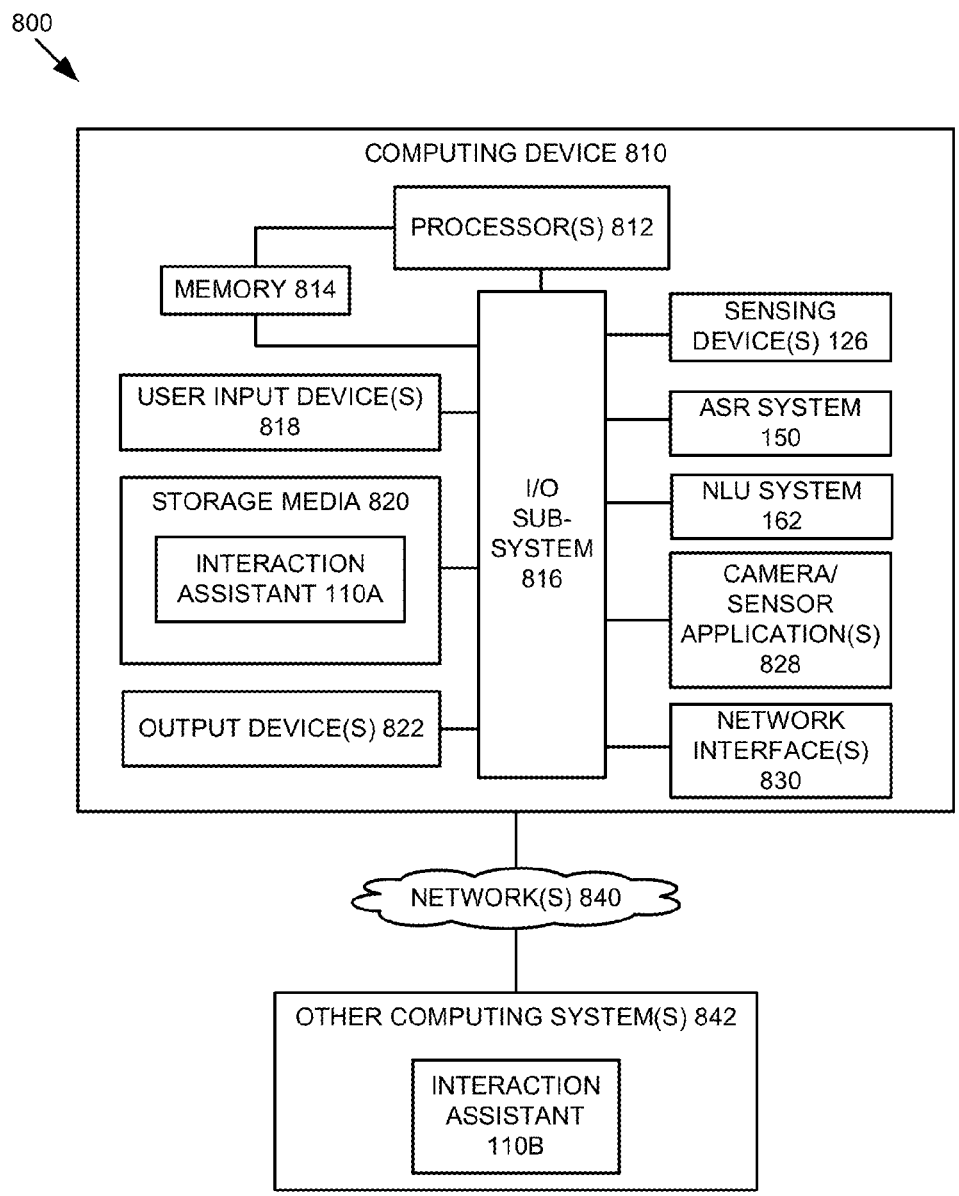
FIG. 8 is a simplified block diagram of an exemplary computing environment in connection with which at least one embodiment of the interaction assistant of FIG. 1 may be implemented.

Referring now to FIG. 8, a simplified block diagram of an exemplary hardware environment 800 for the computing system 100, in which the interaction assistant 110 may be implemented, is shown. The illustrative implementation 800 includes a computing device 810, which may be in communication with one or more other computing systems or devices 842 via one or more networks 840. Illustratively, a portion 110A of the interaction assistant 110 is local to the computing device 810, while another portion 110B is distributed across one or more of the other computing systems or devices 842 that are connected to the network(s) 840. For example, in some embodiments, portions of the interaction model 116 may be stored locally while other portions are distributed across a network (and likewise for other components of the interaction assistant 110). In some embodiments, however, the interaction assistant 110 may be located entirely on the computing device 810. In some embodiments, portions of the interaction assistant 110 may be incorporated into other systems or interactive software applications. Such applications or systems may include, for example, operating systems, middleware or framework (e.g., application programming interface or API) software, and/or user-level applications software (e.g., a virtual personal assistant, another interactive software application or a user interface for a computing device).

The illustrative computing device 810 includes at least one processor 812 (e.g. a microprocessor, microcontroller, digital signal processor, etc.), memory 814, and an input/output (I/O) subsystem 816. The computing device 810 may be embodied as any type of computing device such as a personal computer (e.g., desktop, laptop, tablet, smart phone, body-mounted device, etc.), a server, an enterprise computer system, a network of computers, a combination of computers and other electronic devices, or other electronic devices. Although not specifically shown, it should be understood that the I/O subsystem 816 typically includes, among other things, an I/O controller, a memory controller, and one or more I/O ports. The processor 812 and the I/O subsystem 816 are communicatively coupled to the memory 814. The memory 814 may be embodied as any type of suitable computer memory device (e.g., volatile memory such as various forms of random access memory).

The I/O subsystem 816 is communicatively coupled to a number of components including one or more user input devices 818 (e.g., a touchscreen, keyboard, virtual keypad, microphone, etc.), one or more storage media 820, one or more output devices 934 (e.g., speakers, LEDs, etc.), the one or more sensing devices 126 described above, the automated speech recognition (ASR) system 150, the natural language understanding (NLU) system 162, one or more camera or other sensor applications 828 (e.g., software-based sensor controls), and one or more network interfaces 830. The storage media 820 may include one or more hard drives or other suitable data storage devices (e.g., flash memory, memory cards, memory sticks, and/or others). In some embodiments, portions of systems software (e.g., an operating system, etc.), framework/middleware (e.g., APIs, object libraries, etc.), and/or the interaction assistant 110A reside at least temporarily in the storage media 820. Portions of systems software, framework/middleware, and/or the interaction assistant 110A may be copied to the memory 814 during operation of the computing device 810, for faster processing or other reasons.

The one or more network interfaces 830 may communicatively couple the computing device 810 to a local area network, wide area network, personal cloud, enterprise cloud, public cloud, and/or the Internet, for example. Accordingly, the network interfaces 830 may include one or more wired or wireless network interface cards or adapters, for example, as may be needed pursuant to the specifications and/or design of the particular computing system 100. The other computing system(s) 842 may be embodied as any suitable type of computing system or device such as any of the aforementioned types of devices or other electronic devices or systems. For example, in some embodiments, the other computing systems 842 may include one or more server computers used to store portions of the interaction model 116. The computing system 100 may include other components, sub-components, and devices not illustrated in FIG. 8 for clarity of the description. In general, the components of the computing system 100 are communicatively coupled as shown in FIG. 8 by electronic signal paths, which may be embodied as any type of wired or wireless signal paths capable of facilitating communication between the respective devices and components.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the interaction assistant 110.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected. For example, while certain aspects of the present disclosure may be described in the context of a human-human interaction, it should be understood that the various aspects are applicable to human-device interactions and/or other types of human interactions.

The invention claimed is:

1. A method for assessing an interaction involving at least two participants, at least one of the participants being a person, the method comprising, with a computing system:
detecting, from multi-modal data captured by at least one sensing device during the interaction, a plurality of different behavioral cues expressed by the participants;
analyzing the detected behavioral cues with respect to a plurality of different time scales, each of the time scales being defined by a time interval whose size is compared to the size of other time intervals of the interaction, wherein the plurality of different time scales comprise at least two of a short term time scale, a medium term time scale, and a long term time scale;
recognizing, using machine learning and based on the analysis of the detected behavioral cues, a temporal interaction sequence comprising a pattern of the behavioral cues corresponding to one or more of the time scales; and
deriving, from the temporal interaction sequence, an assessment of the efficacy of the interaction;
wherein at least one indication of the assessment is provided through a device to a user or an application of the computing system.

2. The method of claim 1, wherein the plurality of different behavioral cues of the temporal interaction sequence involves at least one non-verbal cue.

3. The method of claim 1, comprising recognizing a plurality of temporal interaction sequences occurring over different time intervals, at least one of the temporal interaction sequences involving behavioral cues expressed by the person and behavioral cues expressed by another participant, and deriving the assessment from the plurality of temporal interaction sequences.

4. The method of claim 1, wherein each of the plurality of different behavioral cues comprises a cue relating to one or more of: a gesture, a body pose, a pose, an eye gaze, a facial expression, a voice tone, a voice loudness, another non-verbal vocal feature, and verbal content.

5. The method of claim 1, comprising semantically analyzing verbal content of at least one of the behavioral cues and recognizing the temporal interaction sequence based on the semantic analysis of the verbal content.

6. The method of claim 1, comprising semantically analyzing the verbal content of at least one of the behavioral cues and deriving the assessment based on the semantic analysis of the verbal content.

7. The method of claim 1, comprising analyzing the relative significance of each behavioral cue in relation to the temporal interaction sequence as a whole, and deriving the assessment based on the relative significance of each behavioral cue to the temporal interaction sequence as a whole.

8. The method of claim 1, comprising analyzing the relative significance of each behavioral cue in relation to the other behavioral cues of the temporal interaction sequence, and deriving the assessment based on the relative significance of each of the behavioral cues of the temporal interaction sequence.

9. The method of claim 1, comprising recognizing a plurality of temporal interaction sequences, deriving an assessment of the nature of each temporal interaction sequence, and determining changes in the efficacy of the interaction over time based on the assessments of each of the temporal interaction sequences.

10. The method of claim 1, comprising recognizing a plurality of temporal interaction sequences, deriving an assessment of the nature of each temporal interaction sequence, and evaluating the overall efficacy of the interaction based on the assessments of the temporal interaction sequences.

11. The method of claim 1, comprising recognizing a plurality of temporal interaction sequences having overlapping time intervals and deriving the assessment based on the plurality of temporal interaction sequences having overlapping time intervals.

12. The method of claim 1, wherein the plurality of behavioral cues of the temporal interaction sequence comprises at least one behavioral cue that indicates a positive interaction and at least one behavioral cue that indicates a negative interaction.

13. The method of claim 1, comprising presenting a suggestion to one or more of the participants based on the assessment.

14. The method of claim 1, comprising generating a description of the interaction based on the assessment.

15. The method of claim 14, wherein the description comprises a recounting of the interaction, and the recounting comprises one or more behavioral cues having evidentiary value to the assessment.

16. The method of claim 1, comprising determining a semantic meaning of the pattern of behavioral cues and using the semantic meaning to derive the assessment.

17. The method of claim 1, comprising determining the pattern of behavioral cues using a graphical model.

18. The method of claim 17, wherein the graphical model comprises a discriminative probabilistic model.

19. The method of claim 18, wherein the discriminative probabilistic model comprises conditional random fields.

20. The method of claim 1, comprising developing the assessment of the efficacy of the interaction based on changes in the behavioral cues of at least one of the participants over time during the interaction.

21. The method of claim 1, comprising inferring one or more events from the temporal interaction sequence, the one or more events each comprising a semantic characterization of at least a portion of the temporal interaction sequence, deriving an assessment of the one or more events based on the behavioral cues, and deriving the assessment of the efficacy of the interaction based on the assessment of the one or more events.

22. The method of claim 1, comprising determining relationships between or among the behavioral cues of the temporal interaction sequence.

23. The method of claim 1, wherein the duration of each of the plurality of different time scales is defined by the detection of at least two of the behavioral cues.

24. A method for assessing an interaction involving at least two participants, at least one of the participants being a person, the method comprising, with a computing system:
- detecting, from multi-modal data captured by at least one sensing device, a plurality of different behavioral cues expressed by the participants during the interaction, the behavioral cues comprising one or more non-verbal cues and verbal content;
- recognizing, using machine learning, a temporal interaction sequence comprising a pattern of the behavioral cues occurring over a time interval during the interaction, wherein the time interval corresponds to at least one time scale, the at least one time scale being one of a short term time scale, a medium term time scale, and a long term time scale; and
- deriving, from the temporal interaction sequence, an assessment of the efficacy of the interaction;
- wherein at least one indication of the assessment is provided through a device to a user or an application of the computing system.

* * * * *